United States Patent
Kou et al.

(10) Patent No.: US 6,700,592 B1
(45) Date of Patent: Mar. 2, 2004

(54) METHOD AND SYSTEM FOR DYNAMICALLY BUILDING THE GRAPHICAL USER INTERFACE OF A HOME AV NETWORK DEVICE

(75) Inventors: Sho Kou, Saratoga, CA (US); Michael Berkovec, Redwood City, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 687 days.

(21) Appl. No.: 09/608,506

(22) Filed: Jun. 30, 2000

(51) Int. Cl.[7] ................................................ G06F 3/00
(52) U.S. Cl. ........................................ 345/771; 345/733
(58) Field of Search ................................. 345/771, 733, 345/737, 738, 739, 740, 810, 835, 840; 707/513, 104, 10, 3, 902

(56) References Cited

U.S. PATENT DOCUMENTS

| | | | |
|---|---|---|---|
| 6,182,094 B1 | * | 1/2001 | Humpleman et al. ....... 707/513 |
| 6,288,716 B1 | * | 9/2001 | Humpleman et al. ....... 345/771 |
| 6,603,488 B2 | * | 8/2003 | Humpleman et al. ....... 345/771 |

* cited by examiner

*Primary Examiner*—Cao (Kevin) Nguyen
(74) *Attorney, Agent, or Firm*—Wagner, Murabito & Hao LLP

(57) ABSTRACT

A system for dynamically building a graphical user interface of a target device in a home audio video network. The system includes a computer system within a host device coupled to the home audio video network, the computer system having a processor coupled to a memory via a bus. The computer system is configured to implement a graphical user interface for one or more target devices coupled to the home audio video network by executing software stored in the memory, wherein the software causes the computer system to perform the steps for dynamically building the graphical user interface. The steps include enumerating units on the network, each unit being a software based representation of a target device. The subunits within each unit are enumerated, the subunits being software based representations of functions of the target device. The requirements for a GUI (graphical user interface) is then determined for each subunit. The computer system then builds an overall GUI framework by aggregating the requirements. Respective portions of the overall GUI framework are assigned to each subunit discovered during the enumeration. Subsequently, a completed overall GUI interface is rendered on a display for the user, wherein each subunit renders its respective portion of the overall GUI interface.

20 Claims, 5 Drawing Sheets

METHOD AND SYSTEM FOR DYNAMICALLY BUILDING THE GRAPHICAL USER INTERFACE OF A HOME AV NETWORK DEVICE

FIELD OF THE INVENTION

The field of the present invention pertains to audio-video systems. More particularly, the present invention pertains to implementing standardized software based interaction between devices coupled in a home audio video network.

BACKGROUND OF THE INVENTION

A typical home audiovisual equipment set up includes a number of components. For example, a radio receiver, a CD player, a pair of speakers, a television, a VCR, a tape deck, and alike. Each of these components are connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audiovisual system by manipulating the buttons and switches on the front of the tuner, or alternatively, manipulating buttons on the hand held remote control unit.

This conventional home audiovisual system paradigm has become quite popular. As consumer electronic devices become more capable and more complex, the demand for the latest and most capable devices has increased. As new devices emerge and become popular, the devices are purchased by consumers and "plugged" into their home audiovisual systems. Generally, the latest and most sophisticated of these devices are quite expensive (e.g., digital audio tape recorders, DVD players, digital camcorders, and alike). As a consumer purchases new devices, most often, the new device is simply plugged into the system alongside the pre-existing, older devices (e.g., cassette tape deck, CD player, and the like). The new device is plugged into an open input on the back of the tuner, or some other device couple to the tuner. The consumer (e.g., the user) controls the new device via the control buttons on the tuner, via the control buttons and control switches on the front of the new device itself, or via an entirely new, separate, respective remote control unit for the new device.

As the number of new consumer electronics devices for the home audiovisual system have grown and as the sophistication and capabilities of these devices have increased, a number of problems with the conventional paradigm have emerged. One such problem is incompatibility between devices in the home audiovisual system. Consumer electronic devices from one manufacturer often couple to an audiovisual system in a different manner than similar devices from another manufacturer. For example, a tuner made by one manufacturer may not properly couple with a television made by another manufacturer. Within conventional home audiovisual systems, there is not a standardized way of coupling devices such that they interact predictably and reliably. This is especially true in the case of coupling devices from different manufacturers.

In addition, where one device is much newer than another device additional incompatibilities may exist. For example, a new device might incorporate hardware (e.g., specific inputs and outputs) which enables more sophisticated remote control functions. This hardware may be unusable with older devices within the system. Or, for example, older tuners may lack suitable inputs for some newer devices (e.g., mini-disc players, VCRs, etc.), or may lack enough inputs for all devices of the system.

Another problem is the lack of functional support for differing devices within an audiovisual system. For example, even though a television may support advanced sound formats (e.g., surround sound, stereo, etc.), if an older less capable tuner does not support such functionality, the benefits of the advanced sound formats can be lost.

Another problem is the lack of standardized methods of extending the user interface functionality of the devices within the home audiovisual system. For example, conventional prior art devices are not designed to have their user interfaces extended with new features after they are purchased by the enduser. Consequently, the functionality of less sophisticated is typically fixed by the manufacturer as the devices are fabricated. Often the only option available to the user to add new capability is the purchase of a new, more sophisticated device.

While the emergence of networking and interface technology (e.g., IEEE 1394 serial communication bus and the wide spread adoption of digital systems) offers prospects for correcting these problems, there is still no coherent, open, extensible architecture which can provide for intelligent, self configuring, easily extensible devices or AV systems. There are no standardized methods of extending the user interface functionality of devices in a home audiovisual system. For example, while various solutions involving the use of IEEE 1394 as the basis of an AV system, none provide for the extensibility of the user interface capabilities of the various devices coupled within a home AV system over the life times of the devices. There are no standardized, easily extensible methods for augmenting the user interface capability and functionality of simpler devices as new, more sophisticated devices are added within a home AV system.

SUMMARY OF THE INVENTION

Accordingly, what required is a new architecture for a home audiovisual system which corrects the interoperability and functionality problems of the conventional system. What is required is a new architecture for an open, interoperating, audiovisual system for devices within a home network which provides for easy extensibility of the features and functions of the devices. What is required is an architecture which allows devices from any manufacturer to function seamlessly with a home audiovisual system, and which enables other devices from any other manufacturer to augment their functionality. What is required is an architecture which is extensible, and can be readily modified and advanced as market requirements and technology change. What is further required is a standardized, easily extensible method for augmenting the user interface capability and functionality of simpler devices as new, more sophisticated devices are added within a home AV system. The present invention provides a novel solution to these requirements.

In one embodiment, the present invention is implemented as a software based process for dynamically building a graphical user interface (GUI) of one or more target devices in a home audio video network. The system includes a computer system within a host device coupled to the home audio video network, the computer system having a processor coupled to a memory via a bus. The computer system functions as the execution platform for implementing the software based process. Each of the target devices are also coupled to the network and are configured to interact with the host device via the network for user input/interface. The computer system is configured to implement an overall GUI for the one or more target devices coupled to the home audio video network by executing software based process stored in the memory. Upon instantiation, the software causes the computer system to dynamically build the overall GUI, thereby allowing user interface/interaction with each of the target devices from the single overall user interface.

The building of the overall GUI is performed by the host device dynamically, for example, as the host device and one or more target devices are powered up and initialized, or as a new target device is coupled to the network (e.g., hot plugged). In so doing, the host device need not be preprogrammed with specific information regarding the particular GUI requirements of the one or more target devices. As new target devices are added to the network, the host device can automatically reconfigure the overall GUI to utilize the specific capabilities and functions of the new device as a new overall GUI is built.

The host device is configured to implement an overall GUI for multiple functions. In addition to implementing an overall GUI for the one or more devices, in a case where a single device includes multiple functional sub-devices (e.g., a digital camcorder having an image capture sub-device and a storage media sub-device included therein), the host device can tailor the overall GUI to represent the functions and capabilities of each of the functional sub-devices.

In one embodiment, the specific steps of the software based process executed by the computer system of the host device include enumerating units (e.g., devices) on the network, wherein each unit is a software based representation of a target device. The subunits (e.g., functional sub-devices) within each unit are then enumerated, wherein the subunits are software based representations of discrete functions of the target device. The requirements for a GUI is then determined for each subunit. The computer system then builds an overall GUI framework by aggregating the requirements. Respective portions of the overall GUI framework are assigned to each subunit discovered during the enumeration. Subsequently, a completed overall GUI interface is rendered on a display (e.g., an LCD display on the target device, a separate television monitor coupled to the target device, or the like) for the user, wherein each subunit renders its respective portion of the overall GUI interface.

In so doing, process of the present invention provides a home audio visual (AV) network with a standardized architecture for inter-operating CE (consumer electronic) devices in a home network. The interoperability aspects of the present invention define an architectural model, that provides a single consistent overall GUI that allows CE devices to inter-operate and function seamlessly within the user's home AV system. The dynamic building of an overall GUI incorporating the GUI requirements of the various devices and sub-devices implements a method of extending a base set of features of existing CE devices with new features and functionality, as new features and new CE devices are deployed within the home AV network.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, a method and system for dynamically building the graphical user interface of a home AV network device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises a method and system for dynamically building the graphical user interface of a home AV network device. The process of the present invention provides a new architecture for an open, interoperating, audiovisual system for devices within a home network which provides for easy extensibility of the features and functions of the devices. The present invention provides an architecture which allows devices from any manufacturer to function seamlessly with a home audiovisual system, can be readily modified and advanced as market requirements and technology change, and is easily extensible for augmenting the capability and functionality the home audio video network as new, more sophisticated devices are added. The process and system of the present invention, its operation within the context of a home audio video network, and its benefits are described in the discussions which follow.

Notation and Nomenclature

Figure 3:
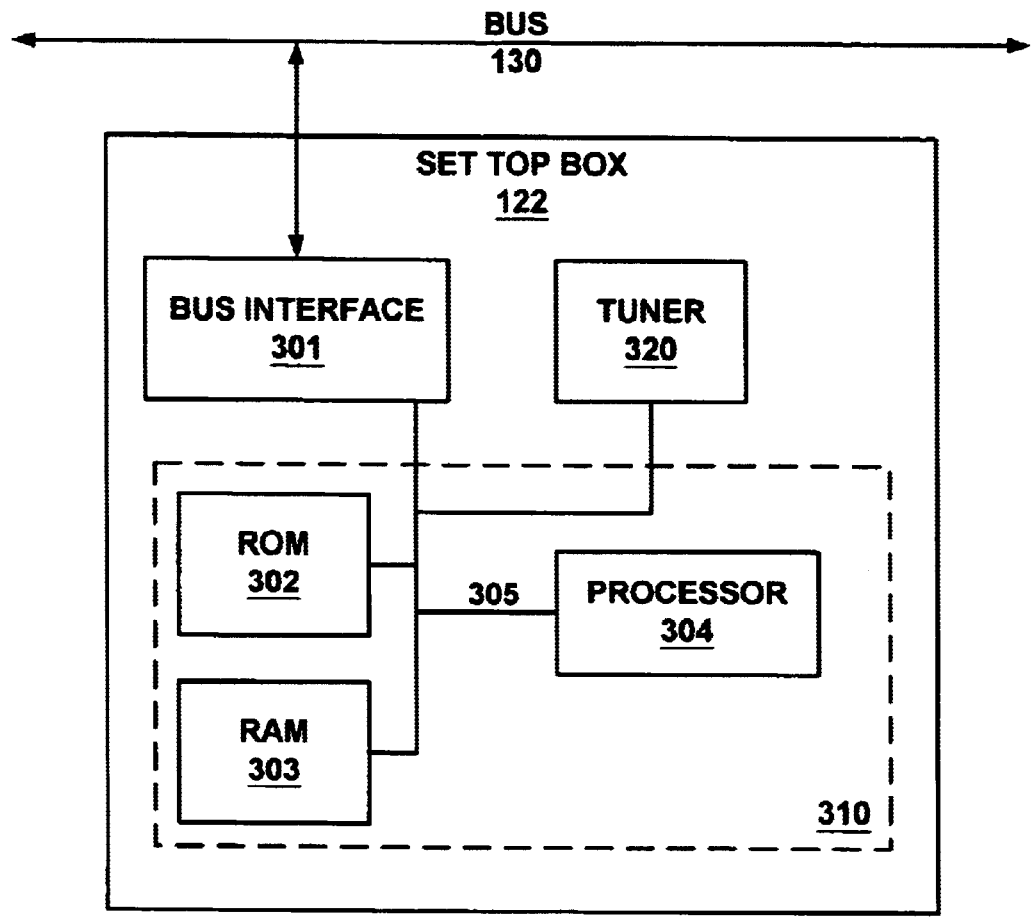
FIG. 3 shows a diagram of the internal components of a set top box host device in accordance with one embodiment of the present invention.

Some portions of the detailed descriptions which follow are presented in terms of procedures, steps, logic blocks, processing, and other symbolic representations of operations on data bits within a computer memory (see FIG. 3). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "instantiating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The Home AV Network Environment

Figure 1:
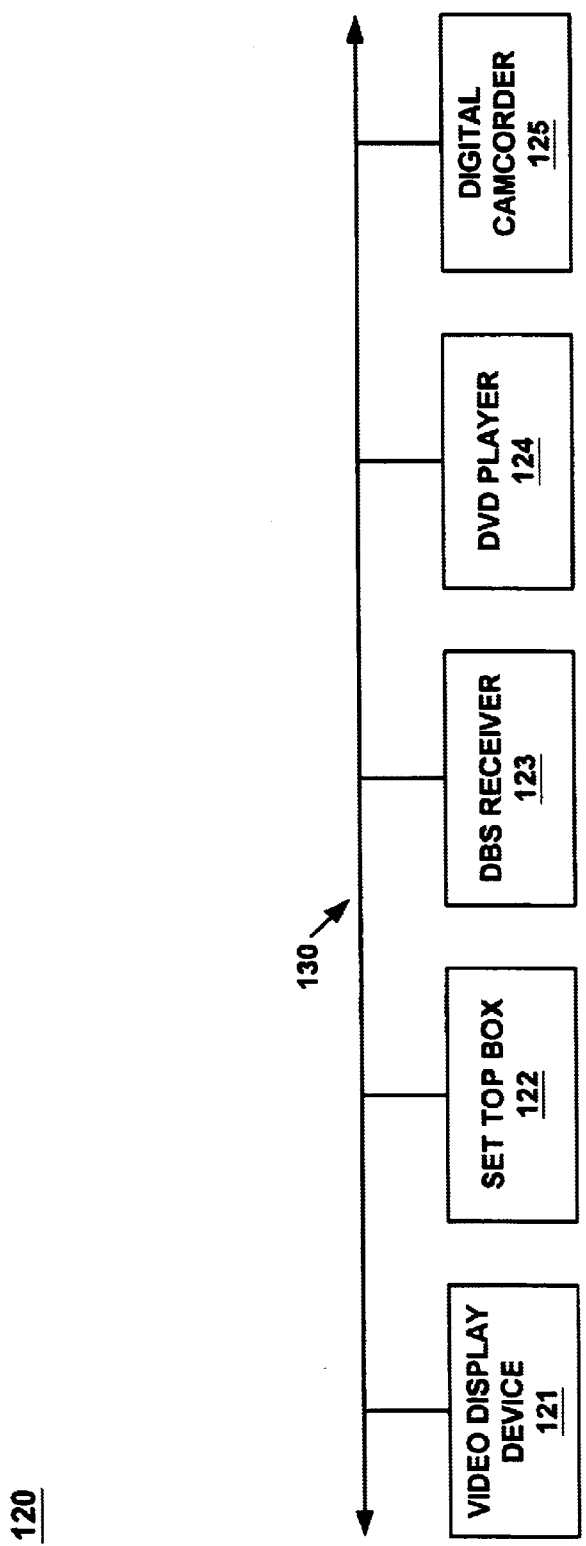
FIG. 1 shows a diagram of a IEEE 1394 based home AV network in accordance with one embodiment of the present invention.

Referring now to FIG. 1, a diagram of a home audio video (AV) network 120 in accordance with one embodiment of the present invention is shown. Network 120 includes 5 devices, a video display device (e.g., television) 121, a set-top box 122, a DBS (direct broadcast satellite) receiver 123, a DVD player 124, and a digital camcorder 125. Each of the devices 121–125 are communicatively coupled via a communications channel 130 to form a single network 120, wherein each device on the network can communicate with any other device on the network. In this embodiment, communications channel 130 is implemented as an IEEE 1394 bus (e.g., in accordance with well known IEEE 1394 bus protocols). While network 120 is shown including 5 devices, it is understood that network 120 is suited to include any number of devices up to the physical limits of the bus technology. In addition, although communications channel 130 is implemented as an IEEE 1394 bus in this embodiment, other bus technologies can be used, such as, for example, Ethernet.

The IEEE 1394 serial bus 130 of FIG. 1 is a high-speed bus architecture for interconnecting digital devices (e.g., devices 121–125) and thereby providing a universal input/output connection. The IEEE 1394 standard defines a digital interface for the applications executing on the various devices coupled to bus 130, thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices 121–125 on bus 130 can be "hot-plugged" in that the devices can be added to and/or removed from the IEEE 1394 bus 130 while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

As described above, it should be appreciated that the present invention can be modified to function in home audio visual networks based upon other well known network or bus standards besides IEEE 1394. Such standards include, for example, Ethernet, universal serial bus, token ring, and the like. Accordingly, the IEEE 1394 structure of network 120 is shown and described herein as one preferred embodiment.

Referring still to FIG. 1, system 120 of the present embodiment functions in part by implementing software based functionality for dynamically building an overall graphical user interface (GUI) for the devices 121–125 coupled to the network 130. In this embodiment set-top box 122 functions as a "host device" that implements the overall GUI for interaction/interface with the user. The overall GUI created by set-top box 122 is used to control the functionality and access the features of each of devices 121–125. This overall GUI is not preprogrammed, predefined, or otherwise prearranged to take into account the specific features and functions of devices 121–125. Rather, the overall GUI is built dynamically by host device 122, for example, as each of the devices 121–125 are initialized (e.g., turned on), or as one or more of the devices 121–125 are "hot plugged" onto bus 130.

In the present embodiment, the functionality for dynamically building the GUI for system 120 is implemented as software executing on set-top box 122. Set-top box 122 (e.g., the host device) includes an embedded computer system having sufficient computation resources to act as the platform for instantiating the software of the present invention. The computer system within set-top box 122 is communicatively coupled to each of the devices (e.g., devices 121 and 123–125) via bus 130, and functions as the execution platform for implementing the software based process. Each of the "target devices" (e.g., devices 121 and 123–125) is configured to interact with the host device via the communication protocols of bus 130 for user input/interface. The computer system is configured to implement an overall GUI for the target devices and provide for their control and interaction with the user through the common overall GUI. Upon instantiation, the software causes the computer system to dynamically build the overall GUI, thereby allowing user interface/interaction with each of the target devices from the single overall user interface.

The building of the overall GUI is performed by the host device (e.g., set-top box 122) dynamically, for example, as the host device and one or more target devices are powered up and initialized, or as a new target device is coupled to the network (e.g., hot plugged). In so doing, the host device need not be preprogrammed with specific information regarding the particular GUI requirements of the one or more target devices. As new target devices are added to the network, the host device can automatically reconfigure the overall GUI to utilize the specific capabilities and functions of the new device as a new overall GUI is built.

Additionally, in the present embodiment, the host device 122 is configured to implement an overall GUI for multiple functions. For example, in addition to implementing an overall GUI for the devices 121 and 123–125, in a case where a single device includes multiple functional sub-devices (e.g., digital camcorder 125 having an image capture sub-device and a storage media sub-device included therein), the host device can tailor the overall GUI to represent the functions and capabilities of each of the functional sub-devices. The operation of the present invention with devices and sub-devices included therein is described in greater detail in the discussion of FIGS. 2–4 below.

Figure 2:
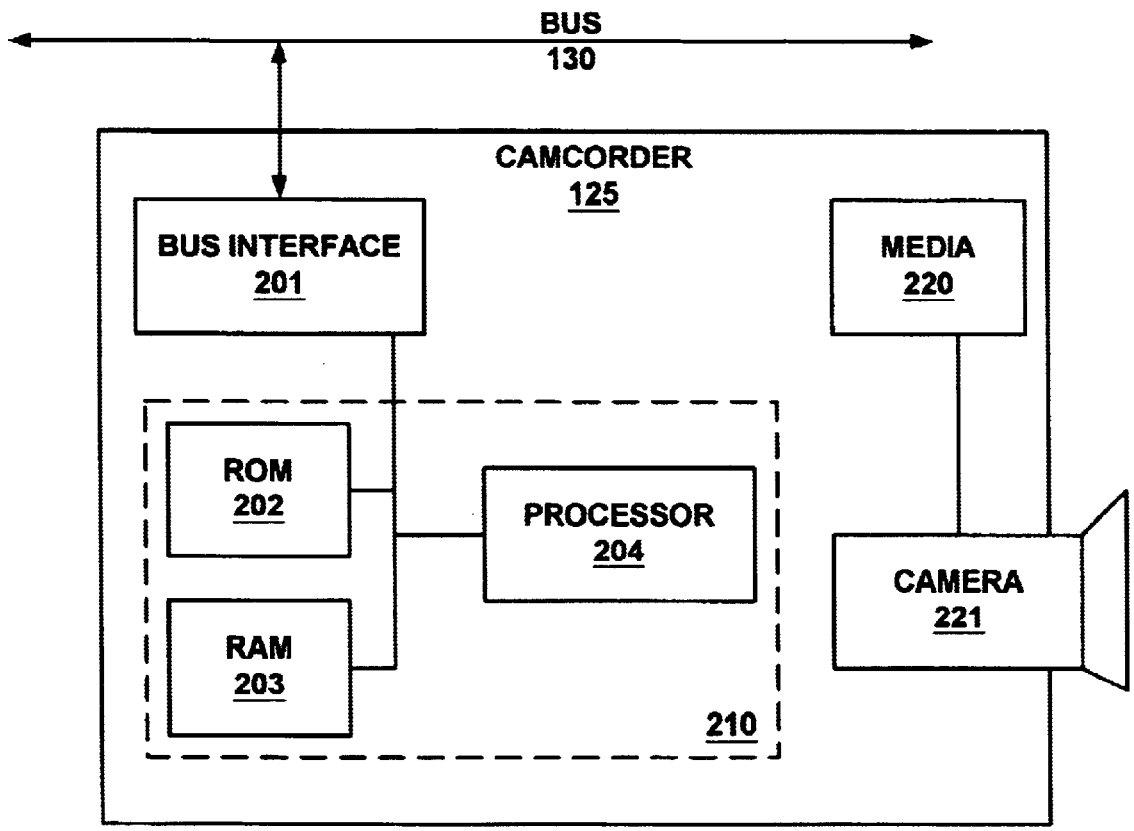
FIG. 2 shows a diagram of the internal components of a digital camcorder target device in accordance with one embodiment of the present invention.

Referring now to FIG. 2, a diagram showing the internal components of digital camcorder 125 is shown. As depicted in FIG. 2, digital camcorder 125 includes a bus interface unit 201 which communicatively couples the camcorder 125 with bus 130. The bus interface unit 201 allows communication with other devices of home AV network system 120 when, for example, the user is ready to share captured video with other devices of the network 120, or playback captured video using other devices of the network (e.g., video display device 121). Digital camcorder 125 also includes an embedded computer system 210 for controlling functionality of storage media 220 and camera 221. Embedded computer system 210 functions by processor 204 executing software stored on ROM 202 (non-volatile read-only memory) and RAM 203 (volatile random access memory).

As described above, some devices of system 120 are capable of including multiple sub-devices. In this case, digital camcorder 125 includes two functional sub-devices, storage media 220 and camera 221.

In the present embodiment, control and interaction with devices is implemented via "proxy" wherein a discrete software object is used to abstract the functionality of a device or sub-device and enable communication/manipulation of the device or sub device via the software object. Other software processes operating within the context of network 120 communicate with the internal hardware of camcorder 125 by accessing the software objects which abstract the functionality of camcorder 125. In other words, instead of communicating with device hardware directly, proxy communication is used wherein applications communicate with coupled devices by accessing the software based "unit" (e.g., a software object representation) of any particular coupled device. The unit functions as a software based communications and control proxy for the device.

The unit functions as a "container" for the various subunits associated with a particular device, and each subunit is a software object providing an interface via which applications invoke related operations provided by the respective sub-device. The unit groups the various subunits which represent the functional components of the particular device. Typically, subunits refer to hardware resources within a device. For example, in the case of digital camcorder 125, camcorder 125 will include at least two subunits for its internal functional components, one subunit controlling functionality of storage media 220 and another subunit controlling functionality of video camera 221. Similarly, in the case of set-top box 122 of FIG. 1, set-top box 122 can include two subunits, a first subunit being associated with the cable television decoding hardware of the set-top box 122, and a second subunit being associated with remote control unit for the set-top box 122. In both of the above cases, the subunits are associated with physical hardware components (e.g., sub-devices) of their respective devices.

FIG. 3 shows a diagram of the internal components of the host device, set-top box 122, in accordance with one embodiment of the present invention. As described above, set-top box 122 implements the functionality for dynamically building the GUI for system 120. Set-top box 122 (e.g., the host device) includes an embedded computer system 310 having sufficient computation resources to act as the platform for instantiating the software modules of the present invention. Set-top box 122 includes a bus interface 301 for communicatively coupling the components of set-top box 122 with network bus 130. Set-top box 122 includes a tuner 320 for tuning audio video programing (e.g., from a cable television system). The overall GUI created by set-top box 122 is rendered on, for example, the display screen of video display device 121 for viewing/interaction by the user. The data for implementing the overall GUI is transmitted to video display device 121 (shown in FIG. 1) via bus interface 301 and bus 130. Embedded computer system 310 includes a processor 304 coupled to a ROM 302 and a RAM 303 via a bus 305.

Within the embedded computer system 310, bus 305 is used for communicating information among the components 302–304. Processor 304 is coupled to bus 305 for processing information and instructions. Computer readable volatile memory, RAM 303, and non-volatile memory, ROM 302, are coupled to bus 305 for storing information and instructions for the processor 304. As described above, certain processes and steps of the present invention are realized as a series of instructions (e.g., one or more software programs) that reside within computer readable memory (e.g., ROM 302 and RAM 303) and that are executed by processor 304 of set-top box 122. When executed, the instructions cause set-top box 122 to implement functionality in accordance with the present invention.

Figure 4:
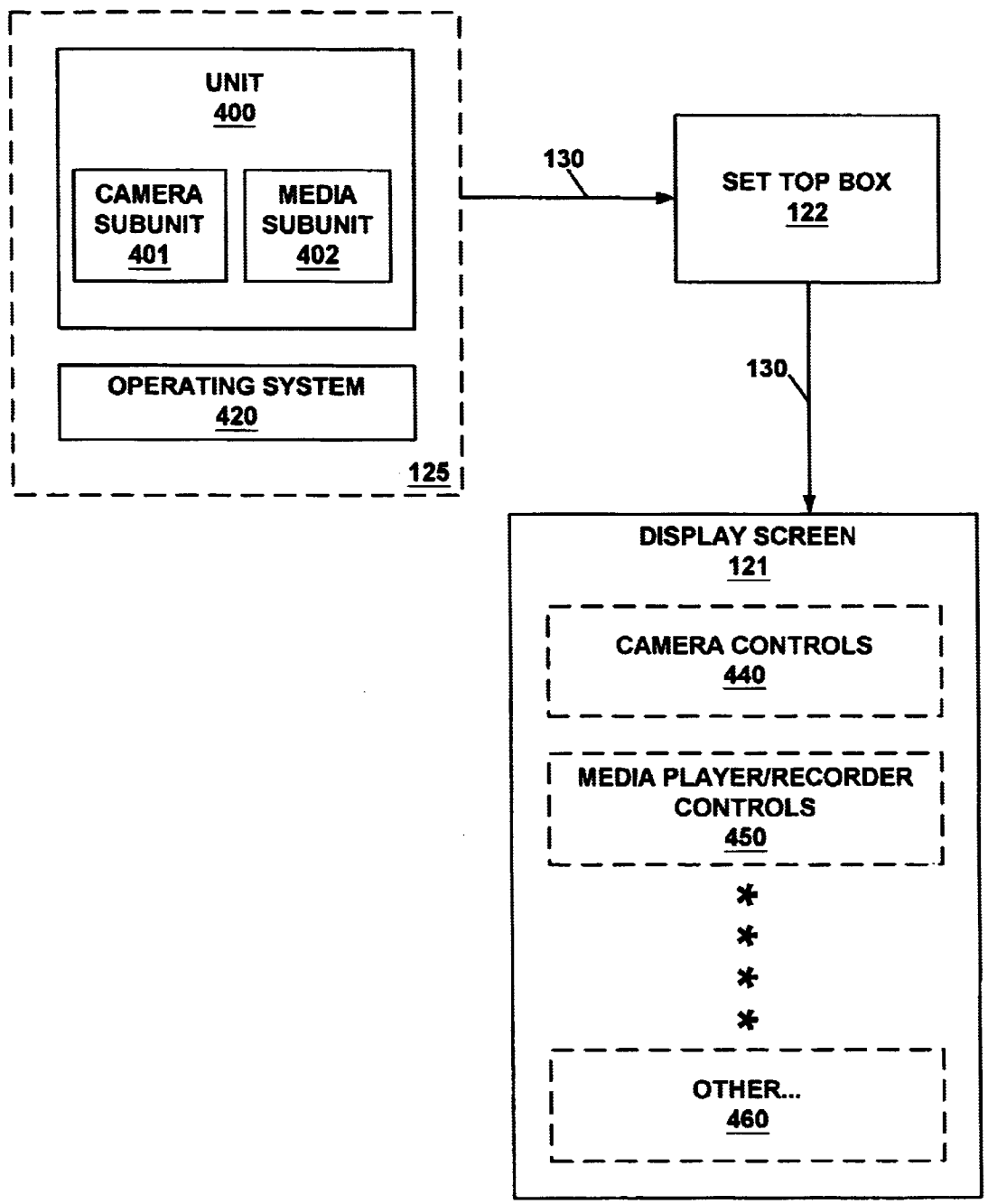
FIG. 4 shows a diagram of the operation of the unit representation of the target device and the included subunit representations for rendering respective portions of the overall GUI interface in accordance with one embodiment of the present invention.

Referring now to FIG. 4, a diagram showing the interaction of a unit 400, including subunits 401–402, with portions of an overall GUI display on LCD screen 330 is shown. As described above, camcorder 125 includes multiple sub-devices, in this case, storage media 220 and camera 221 (shown in FIG. 2). The subunit 401 abstracts the functionality of the camera 221 and subunit 402 abstracts the functionality of storage media 220. Unit 400 functions as the container for the subunits 401–402. As described above, subunits 401–402 are software objects providing an interface via which applications invoke related operations provided by the respective sub-device. In the present embodiment, unit 400 and subunits 401–402 execute on top of a very basic operating system 420 instantiated within the digital camcorder 125.

In order to build the overall GUI display on the display of video display device 121 (hereafter display 121), the host device constructs in overall GUI framework by aggregating the requirements of each of the respective units and subunits coupled to network bus 130. Respective portions of the overall GUI framework are assigned to each subunit, in this case, subunits 401–402. Subsequently, a completed overall GUI interface is rendered on display 121 for the user, wherein each subunit (e.g., subunit 401–402) renders its respective portion of the overall GUI interface. Hence, camera subunit 401 renders a "camera controls" portion 440 of the overall GUI interface and media subunit 402 renders a "media player/recorder controls" portion 450 of the overall GUI interface. Similarly, the other devices (e.g., DBS receiver 123) coupled to network bus 130 can render their respective portion of the overall GUI interface, as shown by the "other" portion 460.

Thus, a graphical user interface for a new device can be dynamically built by combining graphical user interfaces already known to the host device. For example, the host device can dynamically combine the GUI of two or more subunits as appropriate to make a GUI for the new device.

Referring still to FIG. 4, in a preferred embodiment, component object model (COM) technology is used to ensure each subunit's respective GUI appears on the appropriate (usually adjacent) portions of the display121.

It should be noted that the dynamic construction of the overall GUI on display 121 in accordance with the present invention provides a number of advantages. For example, in the case of prior art static-type GUIs, static GUIs can be easily built using standardized application development tools. Many of these tools support "drag-and-drop", which makes it easy for developers to create a GUI customized for any particular new device. However, some new devices will be distributed (or released at a particular user's site) without a customized static GUI. If the host device or controller does not have access to a GUI for such a new device, then the user cannot control that device via that the host device/controller. The dynamic construction of the overall GUI as in the present invention eliminates this problem. Compared to static GUIs, the present invention has the advantage that supports devices unknown to the host device/controller. The new device is responsible for rendering its own portion of the overall GUI display, as opposed to the host device/controller.

It should be noted that another advantage is the fact that complete "top to bottom" dynamic GUIs can be constructed by a program that queries the new device as to each of its capabilities for user control or status display. Then, the program makes calls on standardized user interface software to explicitly construct a rendering, such as a control button, for that feature. However, it takes a developer 10 to 100 times longer to write, test and debug such a top to bottom dynamic GUI program, compared to developing a static GUI. This huge difference in time and complexity is because drag-and-drop tools cannot be used to make such a program. Also, the program must be flexible enough to handle a wide range of both known and unknown features that a new device may have; it is very possible that the new device may not even be on the drawing board when the program is developed. Additionally, testing the program is problematic because of the wide range of features that may be supported by home network devices. In contrast, compared to dynamic GUIs, the dynamic construction of the overall GUI as implemented by present invention has the advantage in that the software it requires (e.g., software to combine two or more existing static GUIs for subunits) is straight forward to develop and test.

Figure 5:
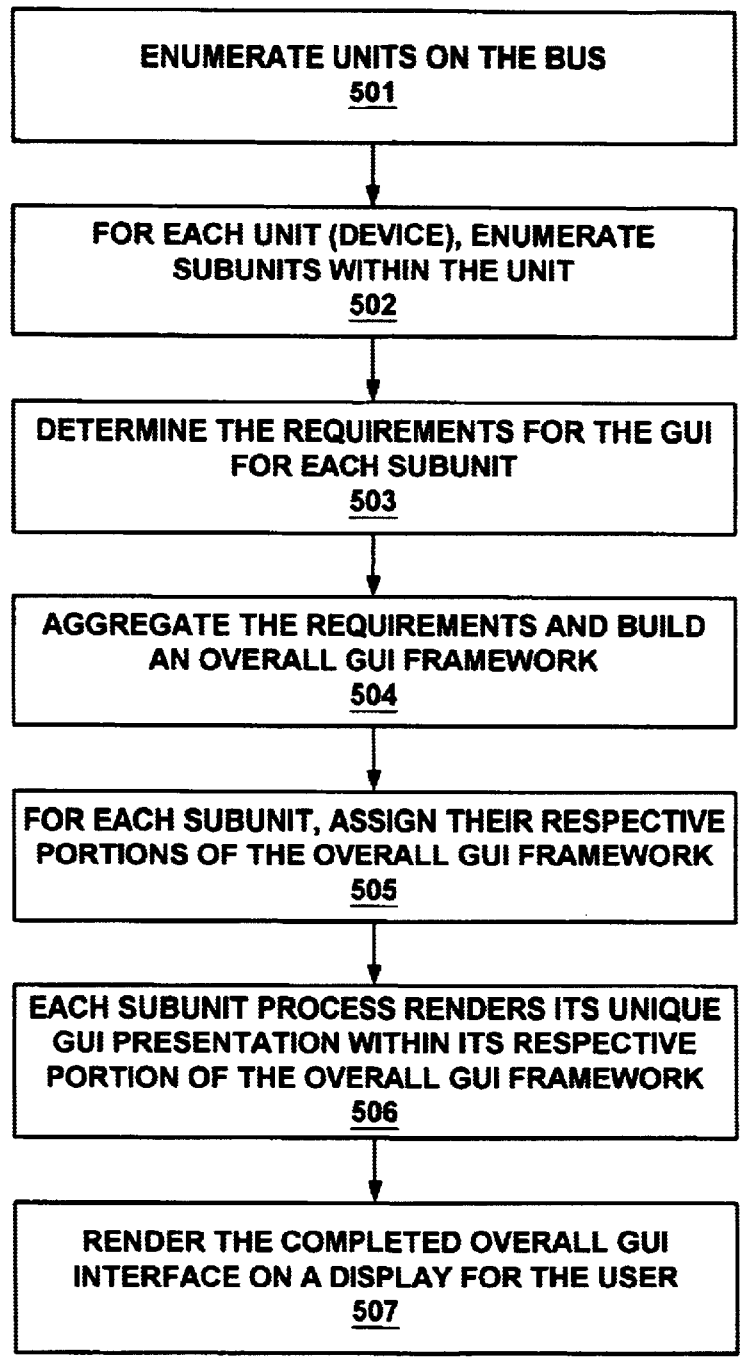
FIG. 5 shows a flow chart of the steps of a dynamic GUI construction process in accordance with one embodiment of the present invention.

Referring now to FIG. 5, a flowchart of the steps of a process 500 in accordance with one embodiment of the present invention is shown. Process 500 depicts the operating steps of a host device (e.g., set top box 122 of FIG. 1) as it dynamically builds the overall GUI for target devices (e.g., digital camcorder 125) coupled to the home AV network.

Process 500 begins in step 501, where the software based process executed by the computer system of the host device enumerates units (e.g., unit 400 of FIG. 4) on the network. As described above, each unit is a software based representation of a target device. In step 502, for each unit, the host device enumerates any subunits (e.g., subunits 401–402) within each unit. As described above, the subunits are software based representations of functions of the target device. In step 503, the requirements for a respective GUI is then determined for each subunit. In step 504, the host device then builds an overall GUI framework by aggregating the requirements of each of the subunits. In step 505, respective portions of the overall GUI framework are assigned to each subunit discovered during the enumeration. In step 506, each subunit process renders its unique GUI presentation within its respective portion of the overall GUI framework. Subsequently, in step 507, a completed overall GUI interface is rendered on a display (e.g., a separate television monitor 121, or the like) for the user.

Thus, the present invention is a method and system that provides a home audio visual (AV) network with a standardized architecture for interoperating CE devices in a home network. The interoperability aspects of the present invention define an architectural model, that provides a single consistent overall GUI that allows CE devices to inter-operate and function seamlessly within the user's home AV system. The dynamic building of an overall GUI incorporating the GUI requirements of the various devices and sub-devices implements a method of extending a base set of features of existing CE devices with new features and functionality, as new features and new CE devices are deployed within the home AV network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for dynamically building a graphical user interface of a target device in a home audio video network, the system comprising:

a computer system included within a host device coupled to the home audio video network, the computer system having a processor coupled to a memory via a bus, the computer system configured to implement a graphical user interface for one or more target devices coupled to the home audio video network by executing software stored in the memory, wherein the software causes the computer system to perform the steps of:

a) enumerating units on the network, each unit being a software based representation of a target device;

b) enumerating subunits within each unit, the subunits being software based representations of functions of the target device;

c) determining requirements for a GUI (graphical user interface) for each subunit;

d) building an overall GUI framework by aggregating the requirements;

e) assigning a respective portion of the overall GUI framework to each subunit enumerated in step b); and f) rendering the completed overall GUI interface on a display for the user, wherein each subunit renders its respective portion of the overall GUI framework.

2. The system of claim 1 wherein the home audio video network is implemented using a bus operating in accordance with a version of IEEE 1394.

3. The system of claim 1 wherein the host device is a set top box coupled to the home audio video network.

4. The system of claim 1 wherein the overall GUI frame work is a COM (component object model) frame work.

5. The system of claim 1 wherein steps a) and b) are performed when a new target device is coupled to the network.

6. The system of claim 1 wherein steps a) and b) are performed when the host device and the target device are powered up and initialized.

7. The system of claim 1 wherein the overall GUI interface is rendered on the display of a television monitor coupled to the network.

8. The system of claim 1 wherein the overall GUI interface is rendered on the display of the host device.

9. A method for dynamically building a graphical user interface of a target device in a home audio video network, the method performed by a computer system included within a host device coupled to the home audio video network, the computer system having a processor coupled to a memory via a bus, the memory storing software which when executed causes the computer system to perform the steps of:

a) enumerating units on the network, each unit being a software based representation of a target device;

b) enumerating subunits within each unit, the subunits being software based representations of functions of the target device;

c) determining requirements for a GUI (graphical user interface) for each subunit;

d) building an overall GUI framework by aggregating the requirements;

e) assigning a respective portion of the overall GUI framework to each subunit enumerated in step b); and f) rendering the completed overall GUI interface on a display for the user, wherein each subunit renders its respective portion of the overall GUI framework to implement a graphical user interface for the one or more target devices coupled to the home audio video network.

10. The method of claim 9 wherein the home audio video network is implemented using a bus operating in accordance with a version of IEEE 1394.

11. The method of claim 9 wherein the host device is a set top box coupled to the home audio video network.

12. The method of claim 9 wherein the overall GUI frame work is a COM (component object model) frame work.

13. The method of claim 9 wherein steps a) and b) are performed when a new target device is coupled to the network.

14. The method of claim 9 wherein steps a) and b) are performed when the host device and the target device are powered up and initialized.

15. The method of claim 9 wherein the overall GUI interface is rendered on the display of a television monitor coupled to the network.

16. The method of claim 9 wherein the overall GUI interface is rendered on the display of the host device.

17. A host device for dynamically building a graphical user interface of a target device in a home audio video network, the host device comprising:

a) means for enumerating units on the network, each unit being a software based representation of a target device;

b) means for enumerating subunits within each unit, the subunits being software based representations of functions of the target device;

c) means for determining requirements for a GUI (graphical user interface) for each subunit;

d) means for building an overall GUI framework by aggregating the requirements;

e) means for assigning a respective portion of the overall GUI framework to each subunit enumerated in step b); and f) means for rendering the completed overall GUI interface on a display for the user, wherein each subunit renders its respective portion of the overall GUI framework.

18. The host device of claim 17 wherein the home audio video network is implemented using a bus operating in accordance with a version of IEEE 1394.

19. The host device of claim 17 wherein the host device is a set top box coupled to the home audio video network.

20. The host device of claim 17 wherein the overall GUI frame work is a COM (component object model) frame work.

\* \* \* \* \*